US 11,765,022 B2

(12) United States Patent
Goto et al.

(10) Patent No.: US 11,765,022 B2
(45) Date of Patent: Sep. 19, 2023

(54) INFORMATION DISTRIBUTION SYSTEM, MONITORING DEVICE, SHARING DEVICE AND INFORMATION DISTRIBUTION METHOD

(71) Applicant: Nippon Telegraph and Telephone Corporation, Tokyo (JP)

(72) Inventors: Shinichiro Goto, Musashino (JP); Hiroyuki Fujiwara, Musashino (JP); Ryoichi Hayashi, Musashino (JP); Masashi Toyama, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/771,492

(22) PCT Filed: Nov. 8, 2019

(86) PCT No.: PCT/JP2019/044012
§ 371 (c)(1),
(2) Date: Apr. 25, 2022

(87) PCT Pub. No.: WO2021/090503
PCT Pub. Date: May 14, 2021

(65) Prior Publication Data
US 2022/0407768 A1    Dec. 22, 2022

(51) Int. Cl.
*H04L 41/069* (2022.01)
*H04L 43/06* (2022.01)

(52) U.S. Cl.
CPC ............ *H04L 41/069* (2013.01); *H04L 43/06* (2013.01)

(58) Field of Classification Search
CPC .............................. H04L 41/069; H04L 43/06
(Continued)

(56) References Cited

U.S. PATENT DOCUMENTS 9,214,037 B2 * 12/2015 Lipsky .................... G06T 13/80
RE46,973 E   *  7/2018 Mohan .................... G06F 16/36
(Continued)

FOREIGN PATENT DOCUMENTS

| JP | 2012-208659 A | 10/2012 |
| WO | 2017/081865 A1 | 5/2017 |
| WO | 2018/186314 A1 | 10/2018 |

OTHER PUBLICATIONS

Office Action dated Feb. 14, 2023, in corresponding JP patent application No. 2021-554792.

*Primary Examiner* — Melvin H Pollack
(74) *Attorney, Agent, or Firm* — XSENSUS LLP

(57) ABSTRACT

An information distribution system includes a plurality of monitoring devices that monitor Information Technology (IT) systems associated with respective monitoring devices, and a sharing device that transmits and receives information to and from the monitoring devices, wherein each of the plurality of monitoring devices includes first processing circuitry configured to provide the sharing device with know-how information including at least detection information and handling procedure information, the detection information being information for detecting a failure based on a log message output from the corresponding IT system, the handling procedure information being information in which a log message related to each failure and a handling procedure for the failure are associated with each other, and acquire the know-how information managed by the sharing device, and the sharing device includes second processing circuitry configured to collect the know-how information provided by the plurality of monitoring devices, and merge the collected know-how information.

7 Claims, 19 Drawing Sheets

(58) Field of Classification Search
USPC .......................................................... 709/224
See application file for complete search history.

(56) References Cited

U.S. PATENT DOCUMENTS

| | | | | |
|---|---|---|---|---|
| 10,116,533 | B1* | 10/2018 | Rodgers | H04L 63/1425 |
| 10,136,249 | B2* | 11/2018 | Ikemoto | H04W 4/02 |
| 10,311,442 | B1* | 6/2019 | Lancaster | G16H 10/00 |
| 10,637,722 | B2* | 4/2020 | Henderson | H04L 41/069 |
| 11,063,816 | B2* | 7/2021 | Bito | H04L 41/069 |
| 11,163,899 | B2* | 11/2021 | Kishi | G06F 16/5838 |
| 11,336,510 | B2* | 5/2022 | Yamane | H04L 43/067 |
| 11,423,756 | B2* | 8/2022 | Dawes | G06Q 30/0601 |
| 11,552,868 | B1* | 1/2023 | Cole | H04L 67/34 |
| 11,586,166 | B2* | 2/2023 | Joyal | G08B 19/005 |
| 2014/0032151 | A1 | 1/2014 | Araki et al. | |
| 2014/0040364 | A1* | 2/2014 | Baldwin | H04L 45/24 |
| | | | | 709/204 |
| 2014/0297311 | A1* | 10/2014 | Jackson | G06Q 30/0201 |
| | | | | 705/2 |
| 2015/0161413 | A1* | 6/2015 | Calem | G16H 10/60 |
| | | | | 705/51 |
| 2015/0249625 | A1* | 9/2015 | Jensen | H04L 51/06 |
| | | | | 709/206 |
| 2018/0143975 | A1* | 5/2018 | Casal | G06F 40/51 |
| 2018/0167402 | A1* | 6/2018 | Scheidler | G06N 20/00 |
| 2018/0357214 | A1 | 12/2018 | Ajiro | |
| 2019/0339687 | A1* | 11/2019 | Cella | G05B 23/0291 |
| 2020/0057906 | A1 | 2/2020 | Tora et al. | |
| 2020/0112612 | A1* | 4/2020 | Chandaria | H04L 67/141 |
| 2020/0295983 | A1* | 9/2020 | Watanabe | H04L 41/069 |

* cited by examiner

Fig. 3

| ID | ABSTRACT EXPRESSIONS OF LOG MESSAGES |
|---|---|
| 1001 | ERROR[¥x20¥t]+nova¥.compute¥. |
| 1002 | pci_stats=¥[PciDevicePool¥. |
| 1003 | allocated[¥x20¥t]+vcpus: |
| 1004 | NOTICE [¥x20¥t]+nova¥.api¥. |

| ID | BLACKLIST AND WHITELIST CLASSIFICATION |
|---|---|
| 1001 | BLACK |
| 1002 | WHITE |
| 1003 | WHITE |
| 1004 | BLACK |

122

| ID | HANDLING PROCEDURE DOCUMENT FILE NAME |
|---|---|
| 1001 | manual1001.pdf |
| 1004 | manual1004.pdf |

Fig. 12

ID-ASSIGNED LOG FILE

| TIME STAMP | ID | REMARKS | ORIGINAL LOG MESSAGE BODY |
|---|---|---|---|
| 2019/06/14 16:10… | 2 | controller01 cinder-volume.log | 2019-06-14 16:10:02.456 13881 DEBUG oslo_service.periodic_task [req-3dcaae73-883e-462a-a… |
| 2019/06/14 16:10… | 7 | compute01 nova-compute.log | 2019-06-14 16:10:03.376 34713 DEBUG nova.virt.libvirt.driver [req-cf0e2eb9-9fc0-4d79-be6a-… |
| 2019/06/14 16:10… | 20 | compute02 neutron-server.log | 2019-06-14 16:10:05.854 28386 DEBUG oslo_messaging_drivers.amqpdriver [req-aafd0988-0d21-4061-a… |

BLACKLIST

| ID |
|---|
| 1, 4, 7, 9, 10 |

WHITELIST

| ID |
|---|
| 2, 3, 5, 6, 8, 11 |

HANDLING-NECESSARY INFORMATION — 1211

| TIME STAMP | ID | REMARKS | ORIGINAL LOG MESSAGE BODY |
|---|---|---|---|
| 2019/06/14 16:10… | 7 | compute01 nova-compute.log | … |

HANDLING-NECESSITY-UNKNOWN INFORMATION — 1212

| TIME STAMP | ID | REMARKS | ORIGINAL LOG MESSAGE BODY |
|---|---|---|---|
| 2019/06/14 16:10… | 20 | compute02 neutron-server.log | … |

HANDLING-UNNECESSARY INFORMATION — 1213

| TIME STAMP | ID | REMARKS | ORIGINAL LOG MESSAGE BODY |
|---|---|---|---|
| 2019/06/14 16:10… | 2 | controller01 cinder-volume.log | … |

Fig. 19

| IDENTIFICATION NUMBER | ABSTRACT EXPRESSIONS OF LOG MESSAGES |
|---|---|
| g1 | AA:D |
| g2 | bp0! |

542

| IDENTIFICATION NUMBER | BLACKLIST AND WHITELIST CLASSIFICATION |
|---|---|
| g1 | BLACK |
| g2 | WHITE |

522

| IDENTIFICATION NUMBER | HANDLING PROCEDURE FILE NAME |
|---|---|
| g1 | man108701.pdf |

| IDENTIFICATION NUMBER | ABSTRACT EXPRESSIONS OF LOG MESSAGES |
|---|---|
| a1 | AA:D |
| a2 | bp0! |

142

| IDENTIFICATION NUMBER | BLACKLIST AND WHITELIST CLASSIFICATION |
|---|---|
| a1 | BLACK |
| a2 | WHITE |

122

| COMMON IDENTIFICATION NUMBER | IDENTIFICATION NUMBER OF OWN ORGANIZATION |
|---|---|
| g1 | a1 |
| g2 | a2 |

154

| IDENTIFICATION NUMBER | HANDLING PROCEDURE FILE NAME |
|---|---|
| g1 | man108701.pdf |

| IDENTIFICATION NUMBER | ABSTRACT EXPRESSIONS OF LOG MESSAGES |
|---|---|
| g1 | AA:D |
| g2 | bp0! |
| g3 | Zx#C |
| g4 | ++KL |
| g5 | ◇_ |
| g6 | AqWe |

542

| IDENTIFICATION NUMBER | BLACKLIST AND WHITELIST CLASSIFICATION |
|---|---|
| g1 | BLACK |
| g2 | WHITE |
| g3 | BLACK |
| g4 | WHITE |
| g5 | WHITE |
| g6 | BLACK |

522

| IDENTIFICATION NUMBER | HANDLING PROCEDURE FILE NAME |
|---|---|
| g1 | man108701.pdf |
| g3 | man472634.pdf |
| g6 | man834097.pdf |

| IDENTIFICATION NUMBER | ABSTRACT EXPRESSIONS OF LOG MESSAGES |
|---|---|
| a1 | AA:D |
| a2 | bp0! |
| a3 | <>_ |
| a4 | {mn} |
| a5 | //[] |
| a6 | ++KL |

142

| IDENTIFICATION NUMBER | BLACKLIST AND WHITELIST CLASSIFICATION |
|---|---|
| a1 | BLACK |
| a2 | WHITE |
| a3 | WHITE |
| a4 | WHITE |
| a5 | BLACK |
| a6 | WHITE |

122

| COMMON IDENTIFICATION NUMBER | IDENTIFICATION NUMBER OF OWN ORGANIZATION |
|---|---|
| g1 | a1 |
| g2 | a2 |

154

| IDENTIFICATION NUMBER | HANDLING PROCEDURE FILE NAME |
|---|---|
| a1 | man108701.pdf |
| a5 | man120965.pdf |

| IDENTIFICATION NUMBER | ABSTRACT EXPRESSIONS OF LOG MESSAGES 542 |
|---|---|
| g1 | AA:D |
| g2 | bp0! |
| g3 | Zx#G |
| g4 | ++KL |
| g5 | <>_ |
| g6 | AqWe |
| g7 | {mn} |
| g8 | //[] |

| IDENTIFICATION NUMBER | BLACKLIST AND WHITELIST CLASSIFICATION 522 |
|---|---|
| g1 | BLACK |
| g2 | WHITE |
| g3 | BLACK |
| g4 | WHITE |
| g5 | WHITE |
| g6 | BLACK |
| g7 | WHITE |
| g8 | BLACK |

| IDENTIFICATION NUMBER OF COMPANY A | COMMON IDENTIFICATION NUMBER 564 |
|---|---|
| a3 | g6 |
| a4 | g7 |
| a5 | g8 |
| a6 | g3 |

| IDENTIFICATION NUMBER | HANDLING PROCEDURE FILE NAME 523 |
|---|---|
| g1 | man108701.pdf |
| g3 | man472634.pdf |
| g6 | man834097.pdf |
| g8 | man120965.pdf |

INFORMATION DISTRIBUTION SYSTEM, MONITORING DEVICE, SHARING DEVICE AND INFORMATION DISTRIBUTION METHOD

CROSS-REFERENCE TO RELATED APPLICATION

The present application is based on PCT filing PCT/JP2019/044012, filed Nov. 8, 2019, the entire contents of which are incorporated herein by reference.

TECHNICAL FIELD

The present invention relates to an information distribution system, a monitoring device, a sharing device, and an information distribution method.

BACKGROUND ART

In recent years, the functions of Information Technology (IT) systems have become more and more complicated, and accordingly, the system configurations are becoming larger and distributed. In order to operate such an IT system soundly, the importance of technique for monitoring and analyzing log files output from the system is also increasing.

Many techniques have been proposed as techniques for efficiently collecting useful information from a huge number of log files output from a system and analyzing it (see, for example, PTL 1). The technique described in PTL 1 is a technique for analyzing various types of and a large number of log messages recorded in log files in a short time, and performs processing of converting log messages into a time-series set of identification numbers in such a way that a plurality of similar log messages are aggregated and an identification number is assigned to each aggregation of log messages. By using the time-series set obtained by the conversion, the output situation can be analyzed.

CITATION LIST

Patent Literature

[PTL 1] International Publication Pamphlet No. WO 2018/186314

SUMMARY OF THE INVENTION

Technical Problem

However, the technique described in PTL 1 has a problem that it may be difficult to distribute log analysis information available between organizations. The technique of PTL 1 is a technique of managing contents as dictionary information in accordance with an original rule in the system, but not taking into consideration distribution. For example, even if the dictionary information of a system is passed to another system as it is, the other system cannot use that information.

Means for Solving the Problem

In order to solve the above-described problems and achieve an object, an information distribution system includes a plurality of monitoring devices that monitor Information Technology (IT) systems associated with respective monitoring devices; and a sharing device that transmits and receives information to and from the monitoring devices, wherein each of the plurality of monitoring devices includes first processing circuitry configured to: provide the sharing device with know-how information including at least detection information and handling procedure information, the detection information being information for detecting a failure based on a log message output from the corresponding IT system, the handling procedure information being information in which a log message related to each failure and a handling procedure for the failure are associated with each other, and acquire the know-how information managed by the sharing device, and the sharing device includes second processing circuitry configured to: collect the know-how information provided by the plurality of monitoring devices, and merge and manage the collected know-how information, and a distribution unit that distributes distribute the know-how information to the plurality of monitoring devices.

Effects of the Invention

According to the present invention, it is possible to distribute information related to log analysis to be available between organizations.

BRIEF DESCRIPTION OF DRAWINGS

FIG. 3 illustrates an example of dictionary information.

FIG. 4 illustrates an example of detection information.

FIG. 12 is a diagram illustrating an example of a result of determination processing.

FIG. 19 illustrates an example of know-how information.

FIG. 20 illustrates examples of know-how information.

FIG. 21 illustrates examples of know-how information.

FIG. 22 illustrates examples of know-how information.

FIG. 23 illustrates examples of know-how information.

DESCRIPTION OF EMBODIMENTS

Figure 1:
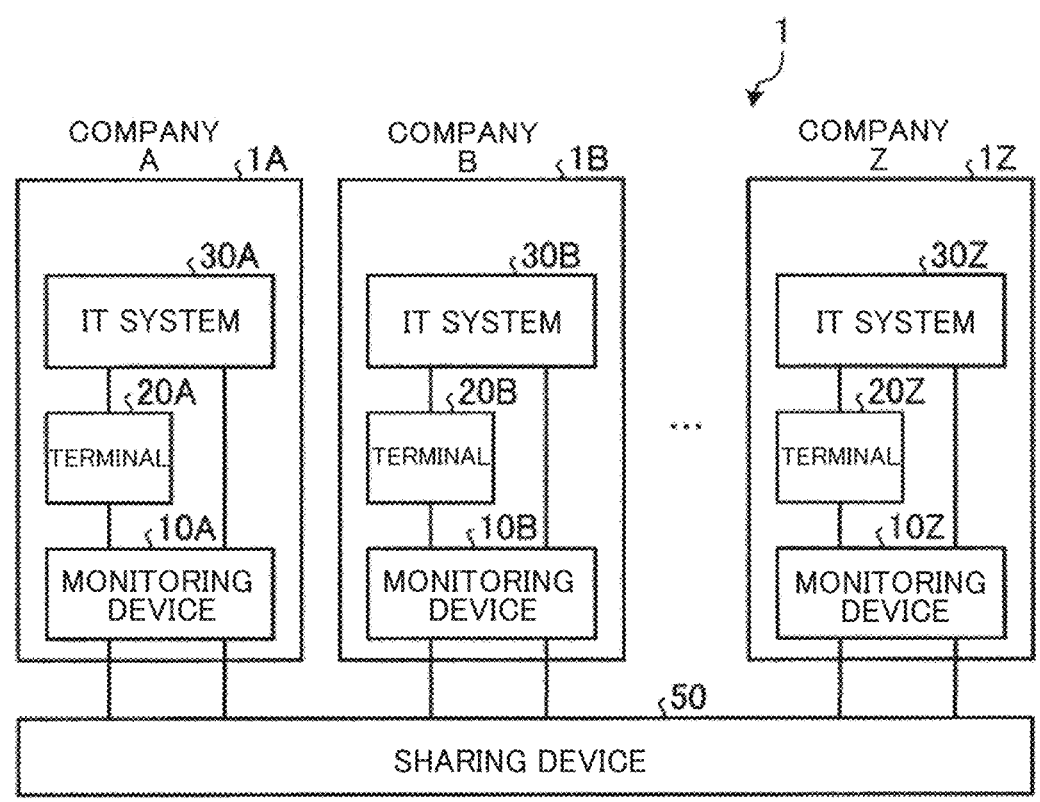
FIG. 1 is a diagram illustrating a configuration example of a distribution system.

Embodiments of an information distribution system, a monitoring device, a sharing device, and an information distribution method according to the present application will be described below in detail with reference to the drawings. Note that the present invention is not limited to the embodiments described below.

Here, although the automation of system monitoring and analysis is progressing by the technique described in PTL 1 and the like, the decision of important matters such as guessing the cause of failure and examining recovery measures is still depends on the experience and intuition of the operator. Therefore, the labor cost related to the operation is a heavy burden on the system operating entity.

On the other hand, even in a single business entity, systems are often operated by their respective sub-organizations as operating entities. Therefore, even if the same failure occurs in multiple operating entities, there will be differences in the cost required to recovery their system because there are differences in the timing of failure occurrence and the system operation skills and experience of the operating entity but the analysis and handling for the failure are closed in each operating entity. In particular, in the initial stage of starting system operation, it is highly expensive to handle frequently occurring system failures because they do not have experience for all failures.

In anticipation of such a tendency, a monitoring system may set the level to indicate an alert in a log message to be low. As a result, a large number of alerts are indicated even in log messages that have nothing to do with system failures, and there is caused a human operation to check all alerts even though no system failure has occurred. Rather, this may result in overlooking of log messages related to failures. Conversely, if the level to indicate an alert in a log message is set to be too high, known failures will be detected but unknown failures will be overlooked. In this way, some know-how for handling failures is required even at the stage of starting system operation.

In this respect, if information on handling of failures can be shared between different organizations and even different companies while satisfying the conditions related to data exchange such as confidentiality, even a first-time failure can be handled immediately. As a result, the speed of failure recovery is improved, the system is stabilized, and the operating costs that have been required to establish a method for handling a first-time failure can be eliminated. Note that, in the following description, an organization is referred to as including a company and departments within the company.

As a technique for distributing information between different organizations, for a content to which each organization assigns a unique identification number to manage, there is a technique for assigning a third identification number different from those in the transmitting organization and the receiving organization to the content and distributing that content, for the purpose of use of the content in the plurality of organizations. Even when an identification number is leaked during transmission and unauthorized access is made to either the transmitting organization or the receiving organization, that technique makes it possible to protect the corresponding relevant information.

On the other hand, in managing the contents related to log analysis in an organization, for such a plurality of contents, a management rule is required as information for associating the contents. Even if the security requirements are satisfied to allow distribution over organizations, for contents being simply distributed, the relationship between the contents will be unclear, making them unavailable, unless the management rule is also distributed. Accordingly, it is necessary to manage such a plurality of contents as well as their management rules at both the content transmitting and receiving sides. In this case, content duplication needs to be eliminated in order to reduce management costs.

Therefore, in distributing contents related to log analysis, for each of the other systems communicable with the own system, it is necessary to manage a plurality of contents as well as their management rules, resulting in increased management costs of the systems. Therefore, for example, for information exchange between A and B and between A and C, correspondence tables between A and B and between A and C are required. Further, even if the same content is transmitted from B and C, it is necessary to record the exchanges between different systems without deduplication as a result of check, so that it is also necessary to manage all the contents.

One of the purposes of an information distribution system according to an embodiment is to reduce management costs and to distribute information related to log analysis to be available between a plurality of organizations. FIG. 1 is a diagram illustrating a configuration example of a distribution system. As illustrated in FIG. 1, an information distribution system 1 includes a monitoring system and a sharing device for each organization. For example, a monitoring system 1A of company A includes a monitoring device 10A, a terminal 20A, and an IT system 30A. As used herein, the reference numerals for the devices and systems may be described as the monitoring device 10, the terminal 20, and the IT system 30 without distinguishing their own organization. The sharing device 50 is capable of data communication with the monitoring system of each organization and functions as a sharing center for sharing information.

The monitoring device 10 is a device for monitoring and operating the IT system 30. The monitoring device 10 provides the sharing device 50 with know-how information related to monitoring of the IT system 30, and acquires know-how information from the sharing device 50. Further, the sharing device 50 merges and manages the know-how information collected from the monitoring device 10. Then, the sharing device 50 distributes the know-how information under management to the monitoring device 10. The know-how information includes detection information, handling procedure information, dictionary information, and the like, which will be described later. Further, the know-how information may include document information.

The monitoring device 10 of each organization manages know-how information in accordance with its own rule. The sharing device 50 collects know-how information, standardizes it, and distributes the resulting know-how information to the monitoring device 10 of each organization. Note that the sharing device 50 may not monitor or operate the IT system, or may both monitor and operate the IT system. Further, the sharing device 50 may construct a system for reproducing an event occurring in the system of each organization in response to an inquiry from the organization.

Figure 2:
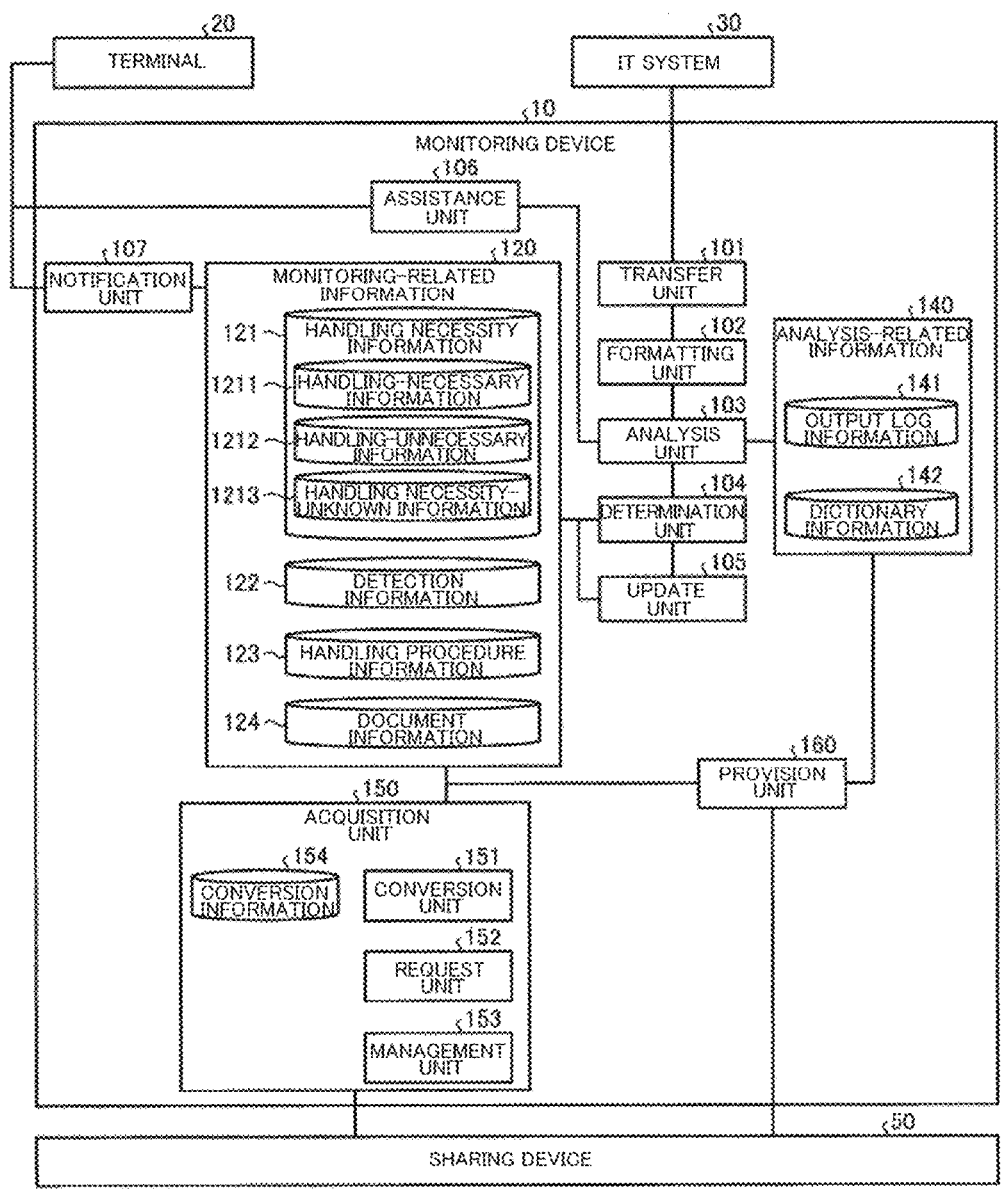
FIG. 2 is a diagram illustrating a configuration example of a monitoring device.

The configuration of the monitoring device 10 will be described with reference to FIG. 2. FIG. 2 is a diagram illustrating a configuration example of a monitoring device. As illustrated in FIG. 2, the monitoring device 10 includes a transfer unit 101, a formatting unit 102, an analysis unit 103, a determination unit 104, an update unit 105, an assistance unit 106, a notification unit 107, an acquisition unit 150, and a provision unit 160. Further, the monitoring device 10 stores monitoring-related information 120 and analysis-related information 140. The monitoring-related information 120 includes handling necessity information 121, detection information 122, handling procedure information 123, and document information 124. Further, the analysis-related information 140 includes output log information 141 and dictionary information 142. Further, the handling necessity information 121 includes handling-necessary information 1211, handling-unnecessary information 1212, and handling necessity-unknown information 1213.

Here, among the information stored in the monitoring device 10, the detection information 122 and the handling procedure information 123 are included in know-how information. Further, the know-how information may further include the dictionary information 142.

As illustrated in FIG. 3, the dictionary information 142 is information in which an ID and an abstract expression of a character string are associated with each other. FIG. 3 illustrates an example of dictionary information. The dictionary information 142 is information in which the detection information 122 and the handling procedure information 123 are associated with each other, and is also information for identifying the abstract expression of a log message by an ID.

It is conceivable that the content of a log message may have a part specific for the log message and an immutable part. Therefore, if the specific part can be represented by a common expression, a plurality of log messages can be aggregated in one format. The dictionary information 142 is information for aggregating a plurality of log messages in one format by a regular expression. The regular expression is an example of the abstract expression.

Further, assigning an identification number on a per abstract expression basis in a log message as in the dictionary information 142 makes it possible to reduce the absolute number of identification numbers to be newly assigned as compared with the case where an identification number is assigned on a per log message basis, and as a result, it is possible to reduce the number of data records to be managed.

The detection information 122 is information for detecting a failure based on a log message output from the IT system 30. FIG. 4 illustrates an example of the detection information. As illustrated in FIG. 4, the detection information 122 is information indicating whether a log message is included in the blacklist or the whitelist.

Figures 5, 6:
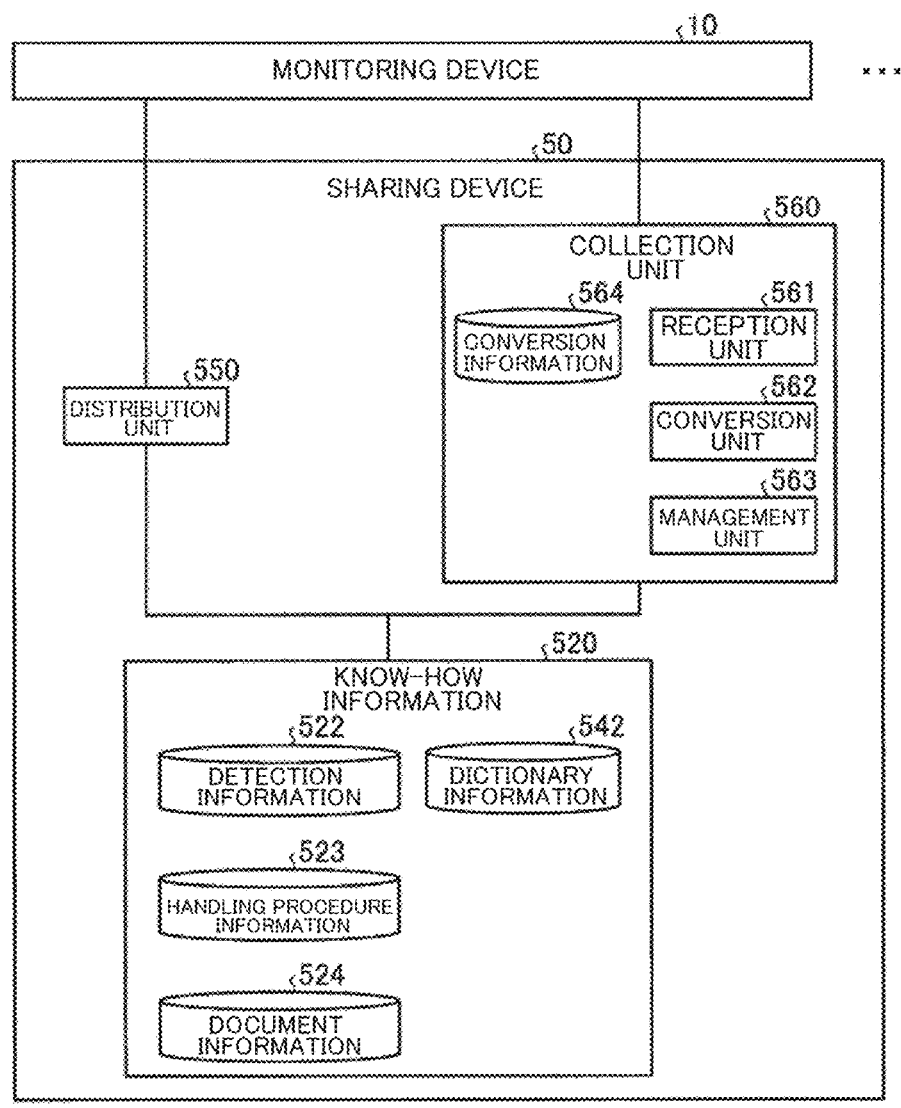
FIG. 5 illustrates an example of handling procedure information.
FIG. 6 is a diagram illustrating a configuration example of a sharing device.

Further, the handling procedure information 123 is information in which a log message related to a failure and a handling procedure for the failure are associated with each other. FIG. 5 illustrates an example of handling procedure information. As illustrated in FIG. 5, the handling procedure information 123 includes the file name of a handling procedure document. Note that the file entity of the handling procedure document is the document information 124.

Each piece of information included in the know-how information is to be updated within the corresponding organization. Specifically, when a first-time log message is detected, a new unique identification number is assigned to the log message. Then, since the log message does not correspond to either the blacklist or the whitelist, the log message is treated as "gray" indicating that its content is to be checked separately, and is associated with either "black" or "white".

After confirming that a first-time failure related to that log message has been handled and thus recovered, this series of procedures is summarized as a document, and the information on the document is added to the handling procedure information 123 and the document information 124. Then, for a similar failure when occurring thereafter, handling is done in accordance with the added document.

Returning to FIG. 2, the transfer unit 101 incorporates a log file composed of log records output from the IT system 30 into the monitoring device 10. The formatting unit 102 formats a log message into a predetermined format. The formatting unit 102 formats a log message, which is information in the log records, into a format that can be read by the analysis unit 103.

The analysis unit 103 analyzes the log message formatted by the formatting unit 102 to classify it as one of predetermined types. Further, the analysis unit 103 identifies the ID of a log message based on the dictionary information in which an ID and an abstract expression of a character string are associated with each other, and classifies the log message based on the identified ID. Further, when the analysis unit 103 issues a new ID, the analysis unit 103 adds that ID to the dictionary information 142.

It is assumed that the analysis unit 103 has a function equivalent to that of the analyzer described in PTL 1. Specifically, the analysis unit 103 can classify the messages included in a text log output from the system by type, and assign to each of the classified messages an ID set for the corresponding type. Then, the analysis unit 103 passes the type to the determination unit 104.

Based on the type and the detection information 122, the determination unit 104 determines whether the log message is the handling-necessary information 1211 which is related to a failure to be handled, the handling-unnecessary information 1212 which is not related to any failure, or the handling necessity-unknown information 1213 which is unknown as to whether to be related to a failure.

The determination unit 104 collates a time series of log messages to which IDs are assigned with the IDs recorded in the detection information 122, determines whether each log message belongs to the blacklist, the whitelist, or neither of them, and thus can classify the log messages into the handling-necessary information 1211 which is related to a failure to be handled, the handling-unnecessary information 1212 which is not related to any failure, and the handling necessity-unknown information 1213 which is unknown as to whether to be related to a failure.

The update unit 105 updates the information related to a log message included in the detection information based on an input from the user. The update unit 105 newly adds to the detection information 122 the relationship between the ID associated with the log message corresponding to the handling necessity-unknown information 1213, handling necessary (blacklist), and handling unnecessary (whitelist). The update unit 105 can also control the determination unit 104 to reflect the update of the detection information 122 on the determination unit 104.

The assistance unit 106 provides an operation interface for classifying the ID associated with the corresponding log message as handling necessary or handling unnecessary.

When the determination unit 104 determines that the log message is the handling-necessary information 1211 or the handling necessity-unknown information 1213, the notification unit 107 searches for a handling procedure for a failure related to the log message and notifies the handling procedure. Specifically, the notification unit 107 sets the handling-necessary information 1211 and the handling necessity-unknown information 1213 as monitoring targets, and when detecting the addition of each of the pieces of information, transmits information corresponding to an alarm to the terminal 20, searches the handling procedure information 123 and the document information 124 for a document that describes a handling procedure for a failure related to the corresponding ID, and presents the resulting document to the terminal 20.

The acquisition unit 150 acquires know-how information managed by the sharing device 50. Further, the acquisition unit 150 manages as conversion information 154 the correspondence between the dictionary information included in the acquired know-how information and the existing dictionary information 142. Further, the acquisition unit 150 includes a conversion unit 151, a request unit 152, and a management unit 153.

The provision unit 160 provides the sharing device 50 with know-how information including at least the detection information 122 which is information for detecting a failure based on a log message output from the IT system 30, and the handling procedure information 123 in which a log message related to a failure and a handling procedure for the failure are associated with each other. The provision unit 160 can provide the know-how information including the dictionary information 142. The provision unit 160 can also provide the know-how information including the document information 524.

The terminal 20 operates the analysis unit 103 to analyze the handling necessity-unknown information 1213, and thus can obtain information necessary for determining whether the corresponding handling necessity-unknown information 1213 is related to a new failure that has not been known so far, or is not related to any failure.

The configuration of the sharing device 50 will be described with reference to FIG. 6. FIG. 6 is a diagram illustrating a configuration example of the monitoring device. As illustrated in FIG. 6, the sharing device 50 includes a distribution unit 550 and a collection unit 560. Further, the sharing device 50 stores the know-how information 520. The know-how information 520 includes detection information 522, handling procedure information 523, document information 524, and dictionary information 542.

The distribution unit 550 distributes the know-how information 520 to the plurality of monitoring devices 10. The collection unit 560 collects the know-how information provided by the plurality of monitoring devices 10, and merges and manages the collected know-how information.

Figure 7:
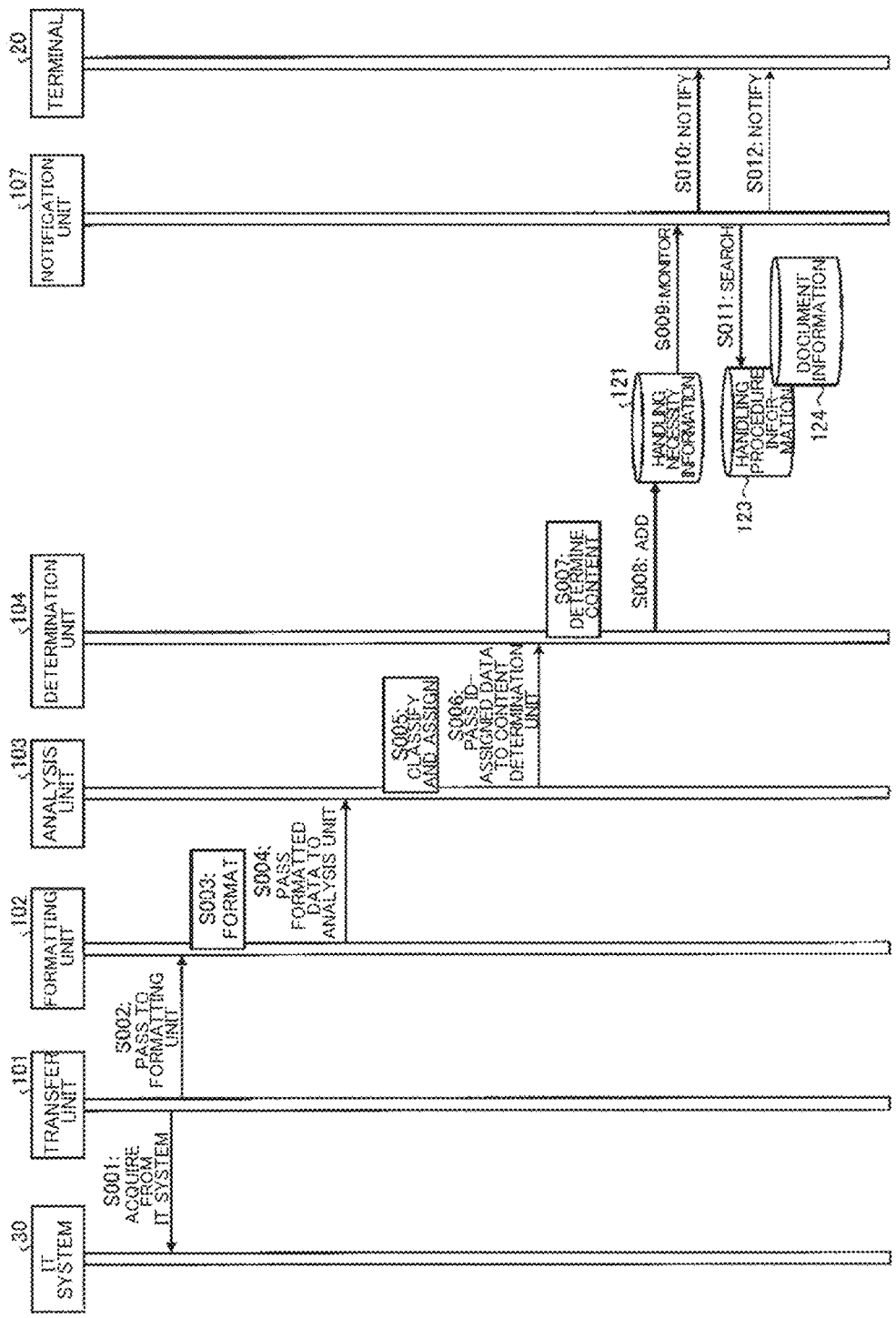
FIG. 7 is a sequence diagram illustrating an example of the flow of processing of monitoring.

FIG. 7 is a sequence diagram illustrating an example of the flow of processing of monitoring. Hereinafter, it is assumed that the method of exchanging information generated between the processing units can support both a file format and a streaming format.

The transfer unit 101 incorporates a log file composed of log records output from the IT system 30 into the monitoring device 10 (step S001) and passes the log file to the formatting unit 102 (step S002).

The formatting unit 102 formats a log message, which is information in the log records, into a format that can be read by the analysis unit 103 (step S003), and passes the formatted information to the analysis unit 103 (step S004).

The analysis unit 103 classifies the log messages by type, assigns to each of the classified messages an ID set for the corresponding type (step S005), and passes the resulting log messages as time-series information of the log messages to which the IDs are assigned to the determination unit 104 (step S006).

The determination unit 104 collates the time series of the log messages to which the IDs are assigned with the IDs recorded in the detection information 122, and determines whether each log message belongs to the blacklist, the whitelist, or neither of them (step S007). Further, the determination unit 104 classifies the log messages into the handling-necessary information 1211 which is related to a failure to be handled, the handling-unnecessary information 1212 which is not related to any failure, and the handling necessity-unknown information 1213 which is unknown as to whether to be related to a failure, and adds the resulting log messages (step S008).

The notification unit 107 sets the handling-necessary information 1211 and the handling necessity-unknown information 1213 as monitoring targets (step S009). When the notification unit 107 detects the addition of each of the pieces of information, the notification unit 107 transmits notification information to the terminal 20 (step S010). The notification unit 107 searches the handling procedure information 123 and the document information 124 for a document that describes a handling procedure for a failure related to the corresponding ID (step S011), and notifies the terminal 20 of the resulting document (step S012).

Figure 8:
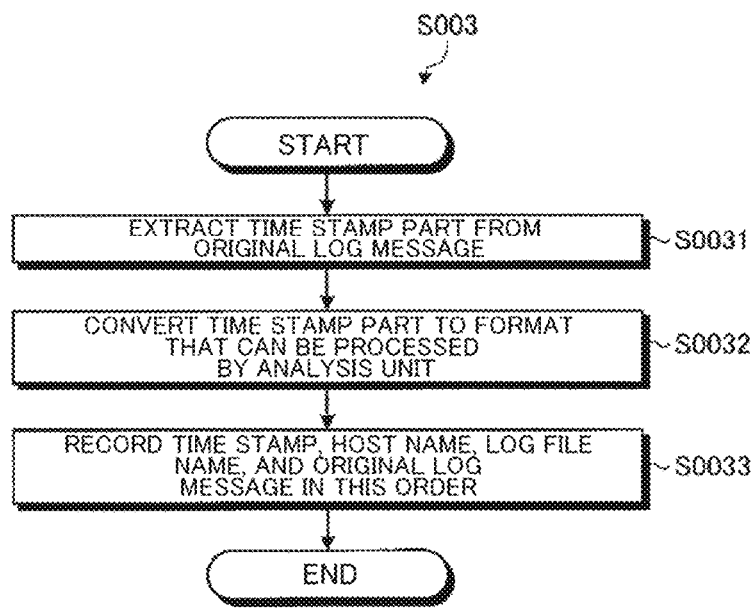
FIG. 8 is a flowchart illustrating an example of the flow of processing of formatting a log message.

FIG. 8 is a flowchart illustrating an example of the flow of processing of formatting a log message. The processing illustrated in FIG. 8 corresponds to the processing of step S003 in FIG. 7. As illustrated in FIG. 8, the formatting unit 102 extracts the time stamp part from an original log message before formatting (step S0031), and converts the time stamp part into a format that can be processed by the analysis unit 103 (step S0032). Further, the formatting unit 102 uses a conversion format in which the time stamp, the output host name, the log file name, and the unformatted log message are arranged in this order to record them (step S0033).

Figure 9:
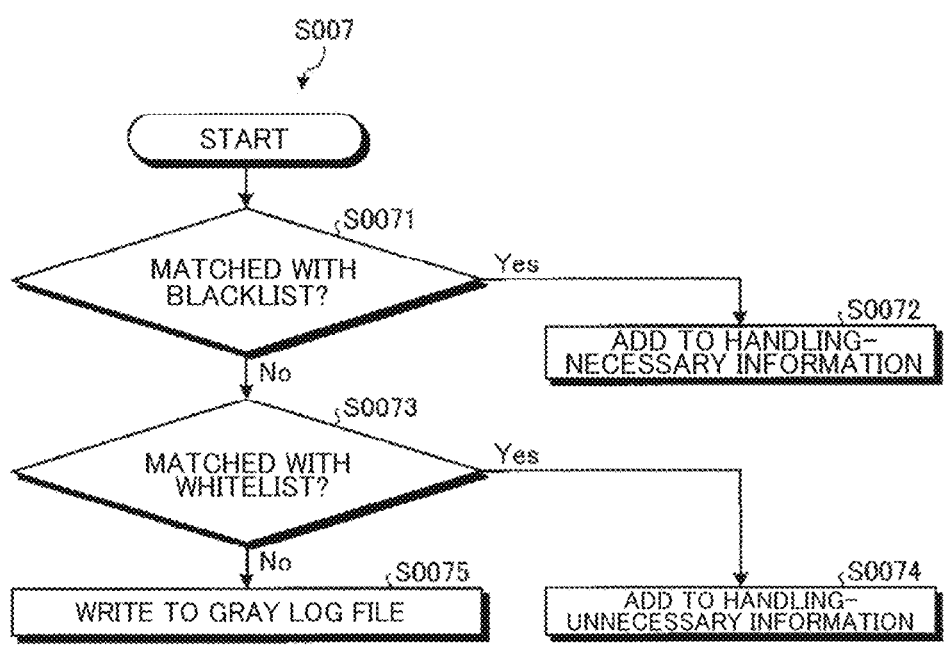
FIG. 9 is a flowchart illustrating an example of the flow of processing of determining whether or not to need to handle.

FIG. 9 is a flowchart illustrating an example of the flow of processing of determining whether or not to need to handle. The processing illustrated in FIG. 9 corresponds to the processing of step S007 in FIG. 7. As illustrated in FIG. 9, the determination unit 104 determines whether or not the log message matches the blacklist by searching the detection information 122 using the ID as key information (step S0071). If the log message matches the blacklist (step S0071, Yes), the determination unit 104 adds the log message to the handling-necessary information 1211 (step S0072).

Next, the determination unit 104 determines whether or not the log message matches the whitelist by the same processing (step S0073). If the log message matches the whitelist (step S0073, Yes), the determination unit 104 adds the log message to the handling-unnecessary information 1212 (step S0074).

If the log message does not match any of the above (No in both steps S0071 and S0073), the determination unit 104 adds the log message to the handling necessity-unknown information 1213 (step S0075).

The order of the blacklist determination and the whitelist determination by the determination unit 104 can be changed according to the output tendency of the system that outputs the log, the monitoring policy, and the like. For example, if a known failure is to be detected as soon as possible, the determination unit 104 may first perform the collation with the blacklist. On the other hand, if the known handling-unnecessary information 1212 is to be removed soon, the determination unit 104 may first perform the collation with the whitelist.

Figure 10:
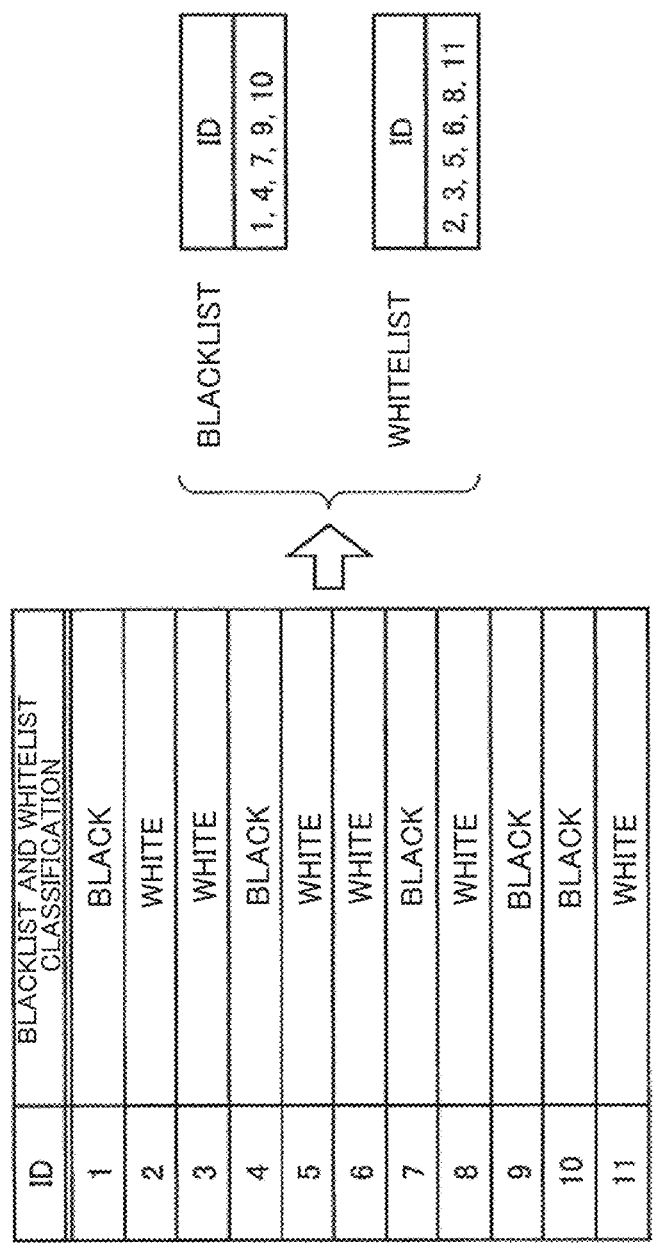
FIG. 10 is a diagram for explaining a method of creating a blacklist and a whitelist.

FIG. 10 is a diagram for explaining a method of creating a blacklist and a whitelist. When the detection information 122 is managed by the DB as illustrated on the left side of FIG. 10, the determination unit 104 performs DB search processing each time the processing of step S007 is performed. In order to avoid this, the monitoring device 10 creates a blacklist and a whitelist from the DB in advance as illustrated on the right side of FIG. 10 and stores them in a memory, so that the calculation cost related to the collation processing can be reduced.

Figure 11:
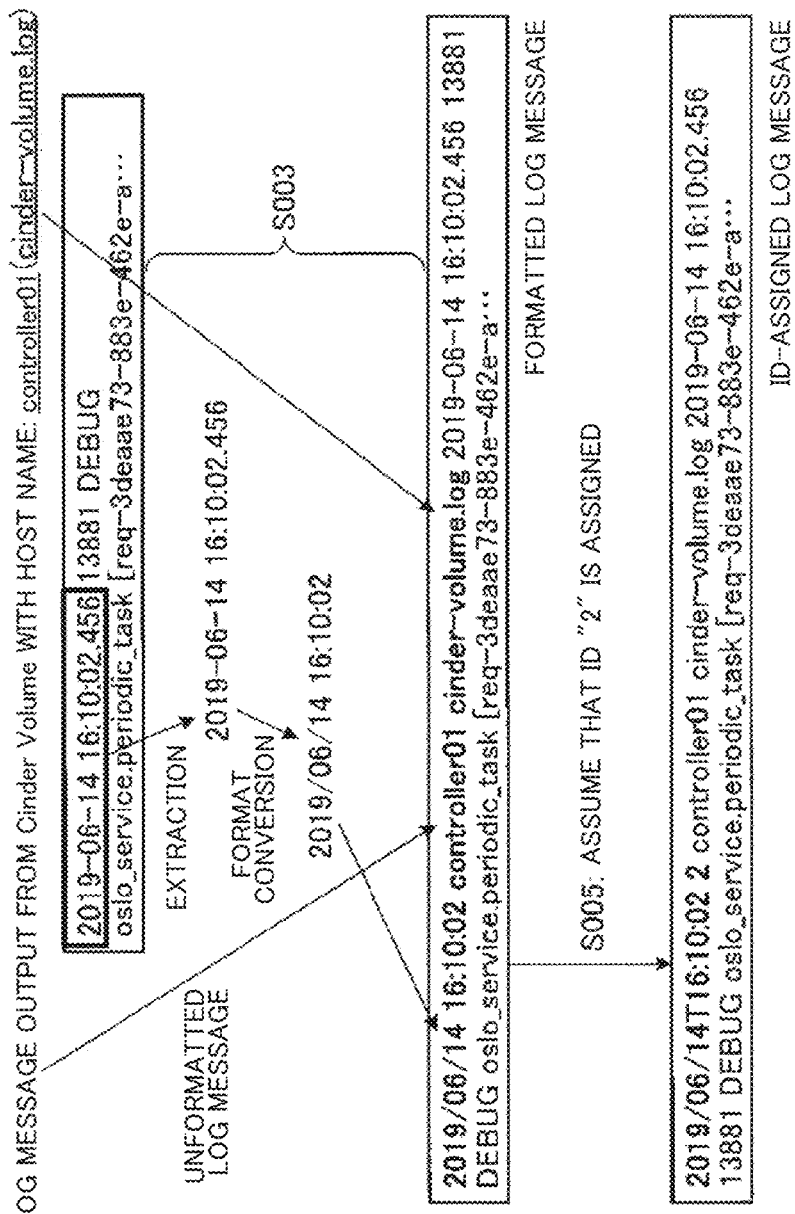
FIG. 11 is a diagram for explaining a method of assigning an ID.

FIG. 11 is a diagram for explaining a method of assigning an ID. A log message of FIG. 11 is one record of a log message (file name: cinder-volume.log) output from a Cinder Volume application program of a controller node identified by the host name: controller01 in a system constituting OpenStack.

The formatting unit 102 extracts the time stamp in the log message, converts the time stamp part into a format that can be processed by the analysis unit 103, and further creates a formatted log message in a conversion format in which the time stamp, the output host name, the log file name, and the unformatted log message are arranged in this order. The analysis unit 103 performs ID assignment processing on the formatted log message.

FIG. 12 is a diagram illustrating an example of a result of determination processing. In the example of FIG. 12, a log file is represented in a table format for the sake of clarity. Now, as to the log file in which IDs have been assigned as illustrated in FIG. 12, since the log message with ID=2 is included in the whitelist in step S007, the determination unit 104 determines that it is the handling-unnecessary information 1212. Further, since the log message with ID=7 is included in the blacklist, the determination unit 104 determines that it is the handling-necessary information 1211. Further, since the log message with ID=20 is not included in either the blacklist or the whitelist, the determination unit 104 determines that it is the handling necessity-unknown information 1213.

Figure 13:
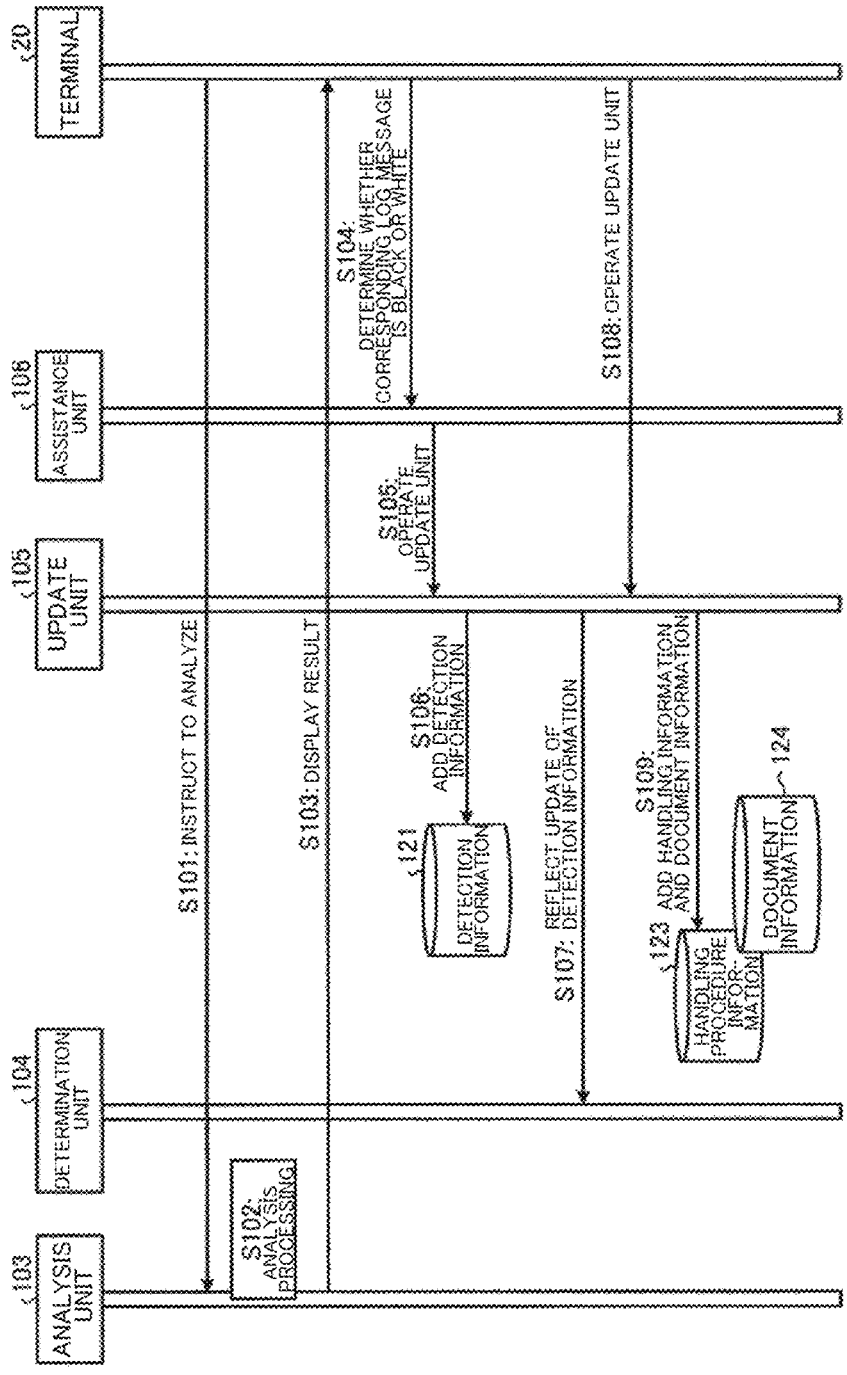
FIG. 13 is a sequence diagram illustrating an example of the flow of processing of updating know-how information.

FIG. 13 is a sequence diagram illustrating an example of the flow of processing of updating know-how information. The user instructs the analysis unit 103 to perform analysis through the terminal 20 (step S101). The analysis unit 103 executes extraction of sequences, extraction of significant logs, removal of extra information, extraction of patterns, etc. single or multiple times (step S102), and presents their results (step S103).

Steps S101 to S103 involve trial and error, and accordingly, the analysis unit 103 repeatedly executes the analysis processing until results sufficient to make a determination are obtained. Then, when the information possible to determine whether or not the log message corresponding to the handling necessity-unknown information 1213 is to be handled (black-and-white determination) is obtained, the user designates the ID associated with the corresponding log message as either black or white through the terminal 20 (step S104).

The assistance unit 106 issues an instruction to be designated as black or white to the update unit 105 (step S105). The update unit 105 adds the corresponding ID and black or white designation to the detection information 122 (step S106). Then, the update unit 105 controls the determination unit 104 to reflect the update of the detection information 122 (step S107). Further, after the procedure for handling the corresponding new failure is established, the update unit 105 adds the corresponding ID, document file name, and document file entity through the operation (step S108) from the terminal 20 (step S109).

Figure 14:
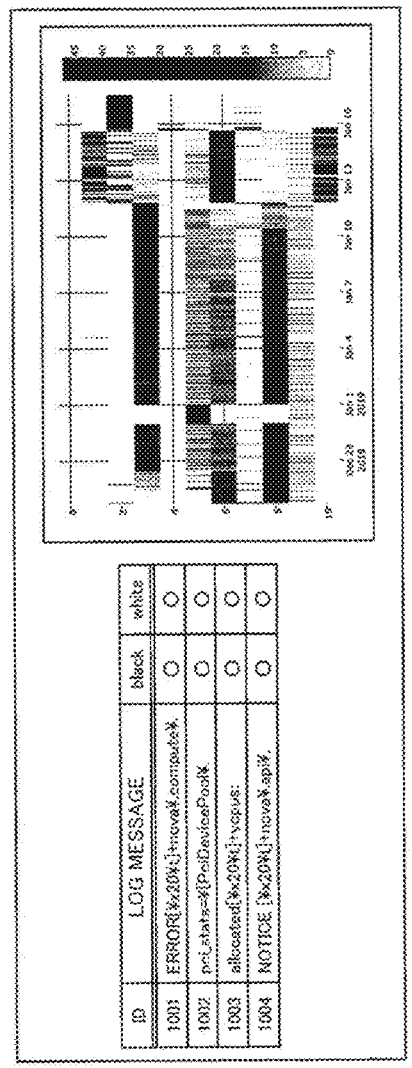
FIG. 14 is a diagram illustrating an example of a GUI for black-and-white determination.

FIG. 14 is a diagram illustrating an example of a GUI for black-and-white determination. The assistance unit 106 displays a GUI for allowing the user to designate an ID, a log message, and black or white on the terminal 20. The grid on the left side of a screen in FIG. 14 displays a list of IDs, log messages, and designations of black or white, and allows the designation of black or white with a radio button. The right side of the screen in FIG. 14 is an area for displaying the result of analyzing the time series of log messages. The user makes the trial and error of the analysis, finally determines which ID log message is related to or unrelated to the failure, and makes the designation through operations on the screen. In response to the designation, the update unit 105 adds the ID and the log message to the detection information 122.

In this way, when the determination unit 104 determines that the log message is the handling necessity-unknown information 1213, the assistance unit 106 notifies the user of the information related to the log message, and further receives an input of information indicating whether or not the log message is the handling-necessary information 1211.

(Processing Related to Information Distribution)

Information distribution accomplished by the provision unit 160, the acquisition unit 150, the distribution unit 550, and the collection unit 560 will be described in detail. The provision unit 160 of the monitoring device 10 transmits to the collection unit 560 of the sharing device 50 the detection information, the handling procedure information, the document information, and the dictionary information that are managed by its own system based on its own rule. The collection unit 560 temporarily holds the received detection information, handling procedure information, document information, and dictionary information.

A reception unit 561 of the collection unit 560 checks for duplication of know-how information. Then, a conversion unit 562 changes the method of managing the received detection information, handling procedure information, document information, and dictionary information based on the original rule of the sharing device 50. A management unit 563 manages the pieces of information for which the method of managing has been changed, by merging them with existing detection information, handling procedure information, document information, and dictionary information, respectively.

The conversion unit 562 manages as conversion information 564 the correspondence between the original rule of the system that has received the information and the original rule of the sharing device 50. Since the reception unit 561 receives the provision of know-how information from a plurality of organizations, it is possible to check here whether or not the same contents of the know-how information provided at the same time are present.

In response to a know-how information request from the acquisition unit 150, the distribution unit 550 transmits to the acquisition unit 150 the detection information, the handling procedure information, the document information, and the dictionary information that are managed by the sharing device 50 based on its own rule.

The request unit 152 of the acquisition unit 150 requests the detection information from the sharing device 50, the handling procedure information, the document information, and the dictionary information that are managed by the sharing device 50. The conversion unit 151 changes the method of managing the received detection information, handling procedure information, document information, and dictionary information of the sharing device 50 based on the original rule of its own system.

The management unit 153 manages the pieces of information for which the method of managing has been changed, by merging them with existing detection information, handling procedure information, document information, and dictionary information, respectively. The conversion unit 151 manages as the conversion information 154 the correspondence between the original rule of the system that has received the information and the original rule of the sharing device 50.

Figure 15:
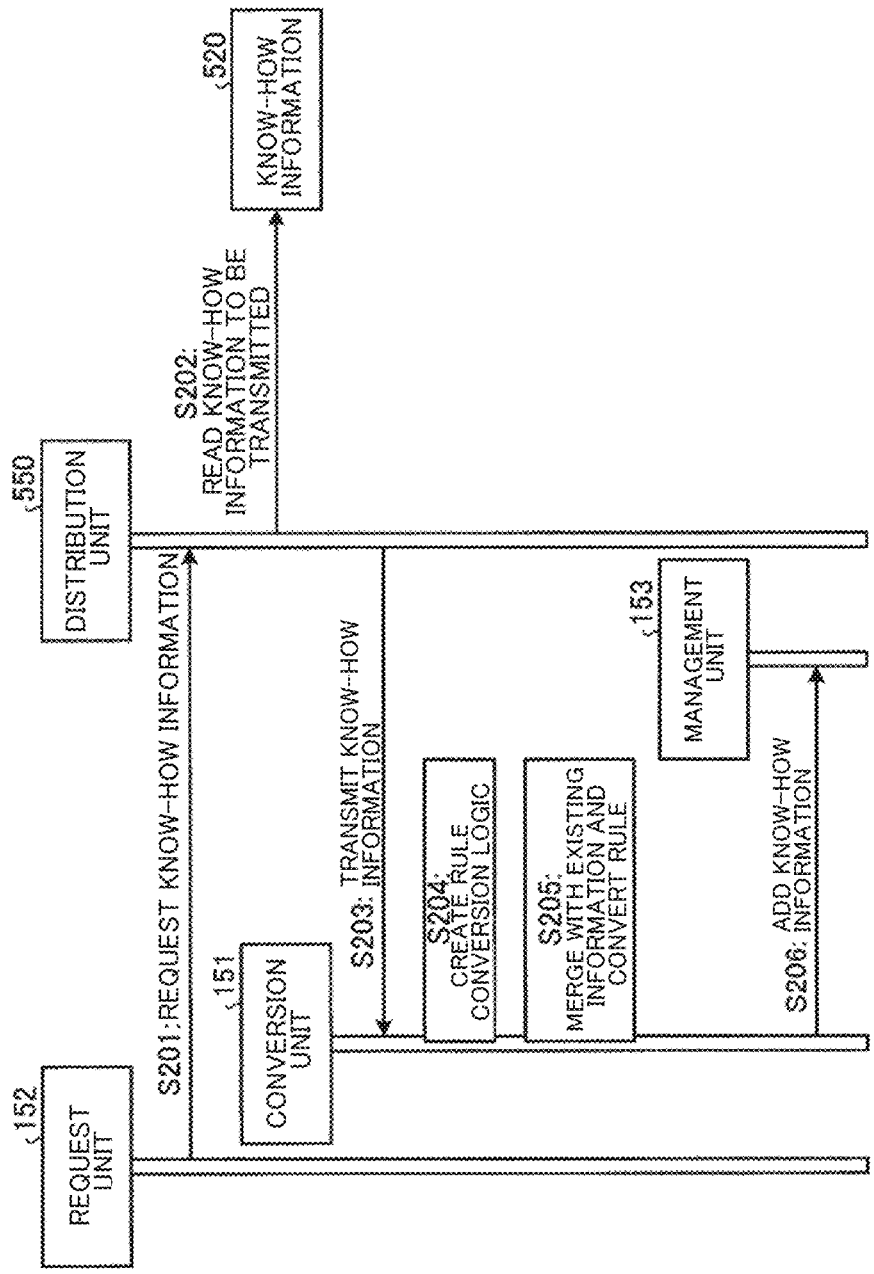
FIG. 15 is a sequence diagram illustrating an example of the flow of processing of acquiring know-how information.

FIG. 15 is a sequence diagram illustrating an example of the flow of processing of acquiring know-how information. As illustrated in FIG. 15, the request unit 152 requests know-how information from the distribution unit 550 of the sharing device 50 (step S201). The distribution unit 550 reads the know-how information 520 to be transmitted (step S202), and transmits that information to the conversion unit 151 (step S203).

The conversion unit 151 creates a rule conversion logic from the received information and the existing managed information (step S204), converts the rule of the received information based on this conversion logic, and merges it with the existing information (step S205). The conversion unit 151 additionally registers only the unregistered information that is not included in the merged existing information (step S206).

Figure 16:
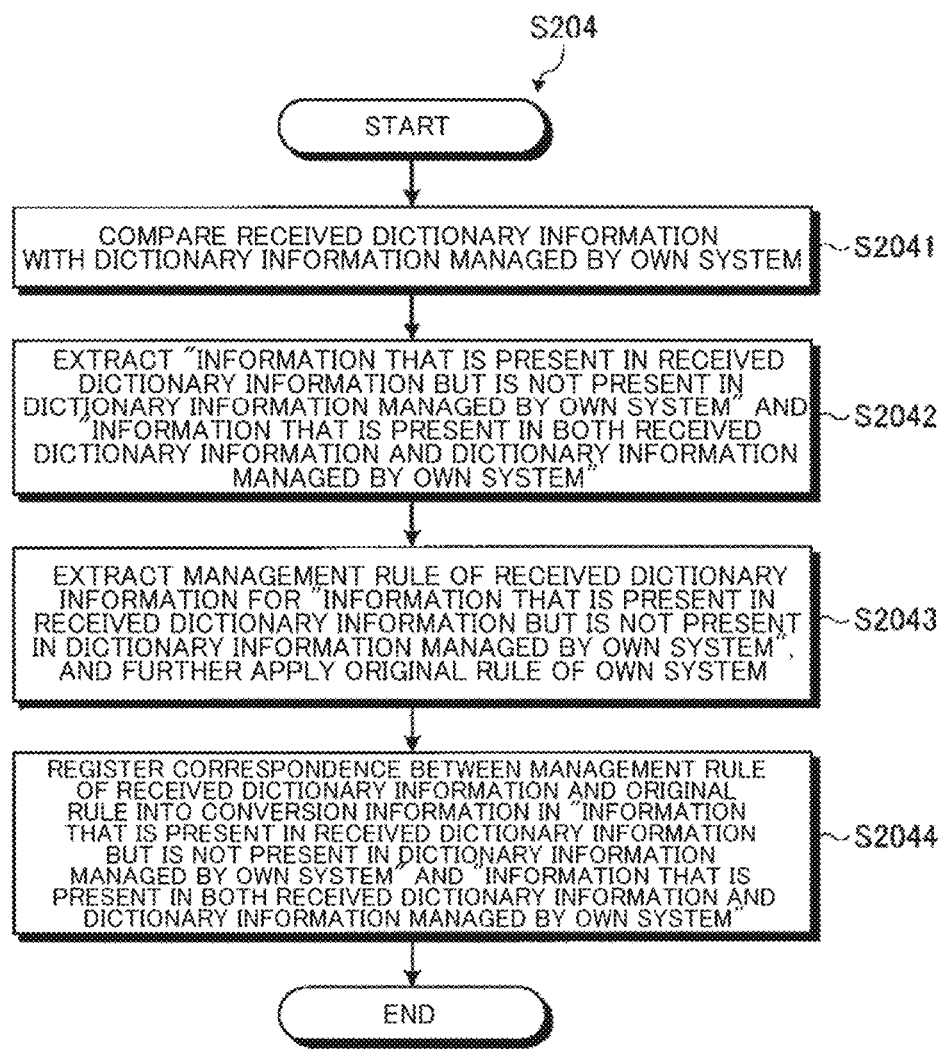
FIG. 16 is a flowchart illustrating an example of the flow of processing of creating a rule conversion logic.

FIG. 16 is a flowchart illustrating an example of the flow of processing of creating a rule conversion logic. The processing illustrated in FIG. 16 corresponds to the processing of step S204 in FIG. 15. As illustrated in FIG. 16, the conversion unit 151 first compares the received dictionary information with the dictionary information managed by its own system (step S2041).

By comparing the two, the conversion unit 151 classifies the information into three types: (1) information that is not present in the received dictionary information but is present in the dictionary information managed by the own system, (2) information that is present in the received dictionary information but is not present in the dictionary information managed by the own system, and (3) information that is present in both the received dictionary information and the dictionary information managed by the own system (step S2042).

The conversion unit 151 extracts the management rule of the received dictionary information for the information classified into type (2) or (3), and further applies the management rule of its own system to type (2) (step S2043). Then, the conversion unit 151 registers the correspondence between the management rule of the dictionary information received for type (2) or (3) and the original rule in the conversion information 154 (step S2044).

Figure 17:
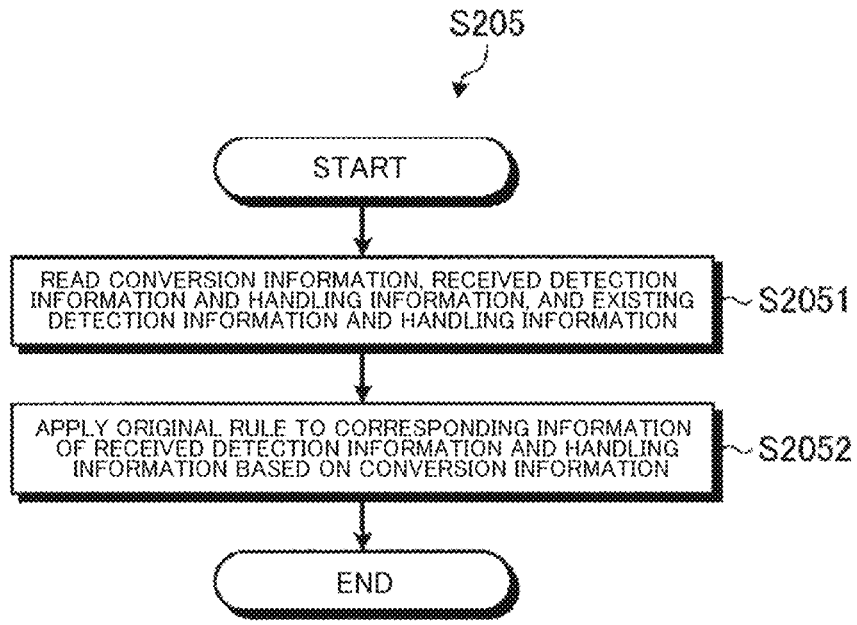
FIG. 17 is a flowchart illustrating an example of the flow of processing of converting a rule.

FIG. 17 is a flowchart illustrating an example of the flow of processing of converting a rule. The processing illustrated in FIG. 17 corresponds to the processing of step S205 in FIG. 15. As illustrated in FIG. 17, the conversion unit 151 reads the conversion information 154 registered in step S2044 (step S2051), and applies the original rule to the corresponding information of the received detection information and handling procedure information (step S2052).

Figure 18:
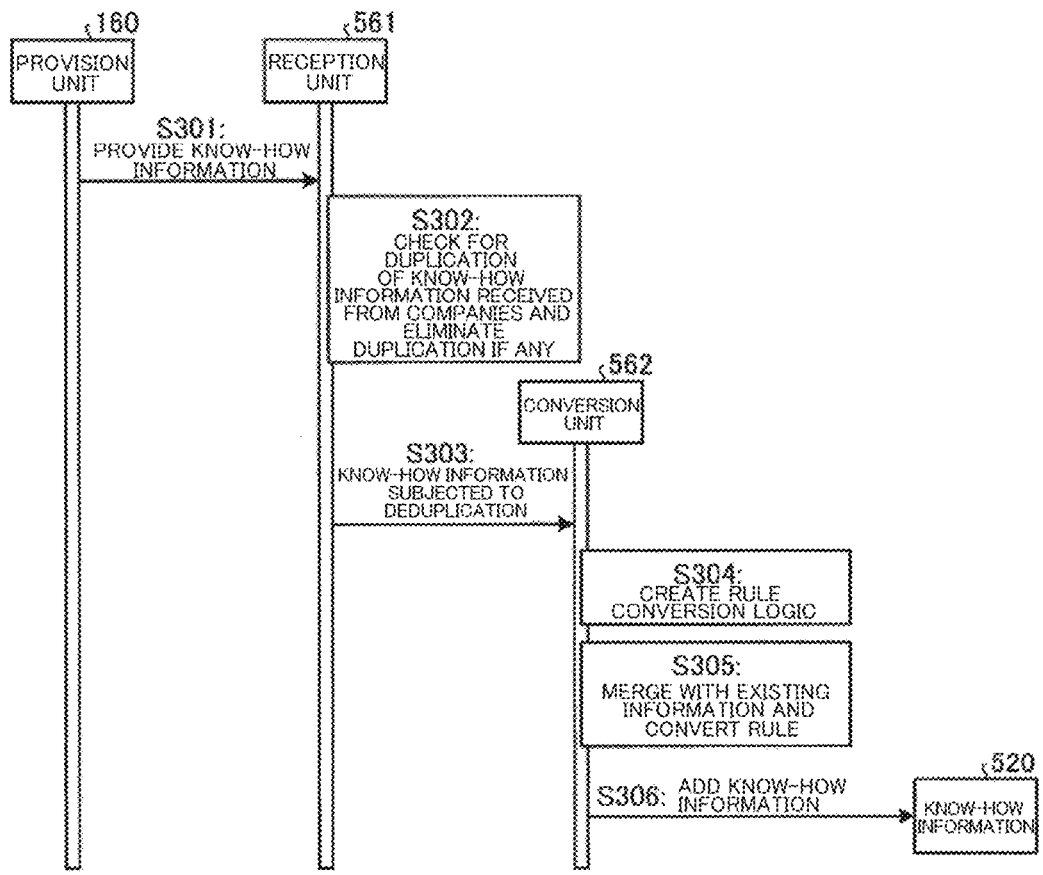
FIG. 18 is a sequence diagram illustrating an example of the flow of processing of providing know-how information.

FIG. 18 is a sequence diagram illustrating an example of the flow of processing of providing know-how information. As illustrated in FIG. 18, the provision unit 160 of the monitoring device 10 provides the know-how information managed by the own system (step S301). At this time, if the reception unit 561 of the sharing device 50 simultaneously has received know-how information from a plurality of companies other than company A, the reception unit 561 checks for duplication of information and eliminates the duplication if any (step S302). Then, the reception unit 561 passes the know-how information subjected to deduplication to the conversion unit 562 (step S303).

The conversion unit 562 creates a rule conversion logic from the received information and the existing managed information (step S304), converts the rule of the received information based on this conversion logic, and merges it with the existing information (step S305). The conversion unit 562 additionally registers only the unregistered information that is not included in the merged existing information (step S306). The processing of steps S304 and S305 is the same as the processing of steps S204 and S205 described above, respectively.

Next, using several types of use cases, the changes in information before and after the exchange of specific information are described. FIGS. 19 to 23 illustrate examples of know-how information. In the examples, it is assumed that the sharing device 50 adopts a rule of assigning identification numbers g1, g2, g3, . . . to pieces of know-how information to manage the pieces of information. Similarly, it is assumed that the monitoring device 10 of company A adopts a rule of assigning identification numbers a1, a2, a3, . . . to pieces of know-how information to manage the pieces of information. Further, it is assumed that the monitoring device 10 of company B adopts a rule of assigning identification numbers b1, b2, b3, . . . to pieces of know-how information to manage the pieces of information. Further, it is assumed that the monitoring device 10 of company Z adopts a rule of assigning identification numbers z1, z2, z3, . . . to pieces of know-how information to manage the pieces of information.

In a first example, it is assumed that company A builds its own system and first requests know-how information from the sharing device 50 in a state where no know-how information is managed yet. FIG. 19 illustrates examples of the detection information 522, the handling procedure information 523, and the dictionary information 542 which are to be managed by the sharing device 50 at the time point when the monitoring device 10 of company A first requests know-how information from the sharing device 50 in the first example. The know-how information registered in the sharing device 50 at this time point is the know-how information provided by companies other than company A, or the know-how information independently established by the sharing device 50 itself.

When the know-how information is distributed from the sharing device 50 to the monitoring device 10 of company A, the know-how information of the monitoring device 10 of company A is as illustrated in FIG. 20. Specifically, according to step S204, since nothing is registered in the dictionary information 142 of the monitoring device 10 of company A in the initial state, the dictionary information 542 of the sharing device 50 is registered as it is. Here, the corresponding identification numbers are assigned a1 and a2, respectively, in accordance with the management rule of company A. At the same time, conversion information 154 is also created. Similarly, since nothing is registered in the detection information 122 and the handling procedure information 123 of the monitoring device 10 of company A in the initial state, the detection information 522 and the handling procedure information 523 of the sharing device 50 are registered as they are. Further, the monitoring device 10 of company A converts the identification numbers in accordance with step S205.

In a second example, it is assumed that company A operates the system with the first example and provides the sharing device 50 with know-how established independently. FIG. 21 illustrates examples of the detection information 522, the handling procedure information 523, and the dictionary information 542 which are managed by the sharing device 50. In the sharing device 50, identification numbers g1, g2, g3, . . . are used for assignment and management. FIG. 22 illustrates examples of the detection information 122, the handling procedure information 123, and the dictionary information 142 which are managed by company A. In company A, identification numbers a1, a2, a3, . . . are used for assignment and management.

In the examples of FIGS. 21 and 22, it is assumed that the information to which a1 is assigned and the information to which g1 is assigned match, and the information to which a2 is assigned and the information to which g2 is assigned match. Here, a1 and a2 are know-how information registered at the initial stage of operation of the monitoring device 10 of company A in the first example. Next, a3 and a6 are know-how information originally created by company A after the start of operation, and it is assumed that they are provided by companies other than company A and are the same as those registered by chance also in the sharing device 50, and a3 and a6 are matched with g5 and g4, respectively. Also, a4 and a5 are know-how information originally created by company A and are not provided to the sharing device 50. Further, g3 and g6 are know-how information provided to the sharing device 50 from companies other than company A.

Assuming that the know-how information is provided from the monitoring device 10 of company A to the sharing device 50 according to FIG. 18 from the states of FIGS. 21 and 22, the sharing device 50 manages the know-how information as illustrated in FIG. 23. Specifically, according to step S304, a3 and a6 in the dictionary information of the monitoring device 10 of company A correspond to the registered pieces of information g6 and g3 of the sharing device 50, respectively. In this case, the registration order of a3 and a6 is the reverse of the registration order of g6 and g3, but they are not particularly changed in the dictionary information 542 because the management rule of the sharing device 50 is followed. This correspondence is recorded in the conversion information 564.

Since a4 and a5 in the dictionary information of the monitoring device 10 of company A are not registered in the sharing device 50, they are registered with identification numbers for the sharing device 50 to become g7 and g8, respectively. In this example, the sharing device 50 registers the unregistered information in the order in which the dictionary information of the system of company A is read. Then, this correspondence is registered in the conversion information 564. Similarly, the detection information of the monitoring device 10 of company A and the unregistered information of the handling procedure information are registered in the detection information 522 and the handling procedure information 523 of the sharing device 50, respectively. Further, the sharing device 50 converts the identification numbers in accordance with step S305.

As described herein, the monitoring devices 10 can manage the dictionary information in accordance with the respective different rules. Specifically, the analysis unit 103 of the monitoring device 10 creates dictionary information in which first IDs are assigned to abstract expressions of character strings, identifies the first ID of a log message based on the dictionary information, and performs classification based on the first ID. For example, the first IDs are identification numbers of a1, a2, a3, and so on assigned by the monitoring device 10 of company A. Further, the provision unit 160 provides the know-how information including the dictionary information.

On the other hand, the collection unit 560 of the sharing device 50 assigns second IDs different from the first IDs to the abstract expressions of the collected pieces of dictionary information to manage the abstract expressions. For example, the second IDs are identification numbers such as g1, g2, g3, and so on assigned by the sharing device 50. Further, the provision unit 160 provides the know-how information including the dictionary information. Then, the distribution unit 550 distributes to the monitoring device 10 the dictionary information in which the second IDs are assigned. Further, the acquisition unit 150 of the monitoring device 10 manages the correspondence between the first IDs and the second IDs as the conversion information 154.

On the other hand, the monitoring device 10 may manage the dictionary information in accordance with a common rule defined by the sharing device 50. In this case, the analysis unit 103 of the monitoring device 10 classifies the log messages based on the dictionary information which is a list of abstract expressions of character strings. Further, the provision unit 160 provides the know-how information including the dictionary information.

The collection unit 560 of the sharing device 50 assigns IDs to the abstract expressions of the collected pieces of dictionary information to manage the abstract expressions. For example, the sharing device 50 assigns identification numbers such as g1, g2, and g3 as IDs. Further, the distribution unit 550 distributes the dictionary information in which the IDs are assigned by the collection unit 560. After that, the acquisition unit 150 of the monitoring device 10 manages the dictionary information by using the IDs assigned by the sharing device 50.

[Effects] As described above, the provision unit 160 provides the sharing device 50 with know-how information including at least the detection information which is information for detecting a failure based on a log message output from the IT system 30, and the handling procedure information in which a log message related to a failure and a handling procedure for the failure are associated with each other. Further, the acquisition unit 150 acquires the know-how information managed by the sharing device 50. Further, the collection unit 560 collects the know-how information provided by the plurality of monitoring devices 10, and merges and manages the collected know-how information. Further, the distribution unit 550 distributes the know-how information to the plurality of monitoring devices 10. In this way, the sharing device 50 can merge the pieces of know-how information used by the plurality of monitoring devices 10 and centrally manage them. As a result, according to the information distribution system 1, it is possible to distribute the information related to log analysis to be available between the organizations.

Note that it is not necessarily limited to detect one failure based on one log message. Specifically, a plurality of failures may be detected based on one log message, and one failure may be detected based on a plurality of log messages. Similarly, the handling procedure for each failure may be related to one log message. In contrast, the handling procedure for each failure may be related to the plurality of log messages.

The formatting unit 102 formats a log message into a predetermined format. Further, the analysis unit 103 analyzes the log message formatted by the formatting unit 102 to classify the log message as one of predetermined types. Further, based on the type and the detection information, the determination unit 104 determines whether the log message is the handling-necessary information 1211 which is related to a failure to be handled, the handling-unnecessary information 1212 which is not related to any failure, or the handling necessity-unknown information 1213 which is unknown as to whether to be related to a failure. Further, when the determination unit 104 determines that the log message is the handling-necessary information 1211 or the handling necessity-unknown information 1213, the notification unit 107 searches the handling procedure information for a handling procedure for a failure related to the log message and notifies the handling procedure. In this way, the monitoring device 10 performs monitoring using pieces of know-how information collected by a plurality of organizations. This allows the user to obtain monitoring results based on more information.

The analysis unit 103 classifies the log messages based on the dictionary information which is a list of abstract expressions of character strings. Further, the provision unit 160 provides the know-how information including the dictionary information. Further, the collection unit 560 assigns IDs to the abstract expressions of the collected pieces of dictionary information to manage the abstract expressions. Further, the distribution unit 550 distributes the dictionary information in which the IDs are assigned by the collection unit 560. As a result, the monitoring device 10 can manage the know-how information by using the common rule without applying the original rule.

The analysis unit 103 creates dictionary information in which first IDs are assigned to abstract expressions of character strings, identifies the first ID of a log message based on the dictionary information, and performs classification based on the first ID. Further, the provision unit 160 provides the know-how information including the dictionary information. Further, the collection unit 560 assigns second IDs different from the first IDs to the abstract expressions of the collected pieces of dictionary information to manage the abstract expressions. Further, the distribution unit 550 distributes the dictionary information in which the second IDs are assigned. Further, the acquisition unit 150 manages the correspondence between the first IDs and the second IDs as the conversion information 154. As a result, the monitoring device 10 can use its own rule to be applied while maintaining the identification information of the shared know-how information.

The analysis unit 103 identifies the ID of a log message based on the dictionary information in which an ID and an abstract expression of a character string are associated with each other, and classifies the log message based on the identified ID. Further, the provision unit 160 provides the know-how information including the dictionary information. As a result, the information distribution system can aggregate a plurality of log messages and manage them as know-how information.

The acquisition unit 150 manages as conversion information the correspondence between the dictionary information included in the acquired know-how information and the existing dictionary information. As a result, the monitoring device 10 can use its own rule to be applied while maintaining the identification information of the shared know-how information.

When the determination unit 104 determines that the log message is the handling necessity-unknown information 1213, the notification unit 107 notifies the user of the information related to the log message, and further receives an input of information indicating whether or not the log message is the handling-necessary information 1211. Further, the update unit 105 updates the information related to a log message included in the detection information based on an input from the user. As a result, the information distribution system 1 can reflect the results determined by the user on the know-how information.

Note that, as described above, the analysis unit 103 can perform the same processing as the analyzer described in PTL 1. Specifically, the analysis unit 103 classifies the messages included in a text log output from the system by type, and assigns to each of the classified messages an ID set for the corresponding type. Further, the analysis unit 103 creates a matrix in which the appearance status of a message in a text log at a predetermined time interval is represented for each ID based on the occurrence date and time attached to the message. Further, the analysis unit 103 extracts a plurality of patterns that are combinations of IDs from the created matrix. Further, the analysis unit 103 calculates the importance of each of the IDs included in each of the plurality of patterns, and determines whether or not the importance is equal to or higher than a predetermined threshold value. Further, the analysis unit 103 creates a significant log in which only the IDs determined by the determination step to be equal to or higher than the predetermined threshold value are extracted from a log in which the messages of the text log are replaced with the IDs assigned in the classification step. Further, the analysis unit 103 counts the number of occurrences of each of the sequences indicating the order in which the IDs having high importance appear, from the created significant log, and extracts sequences in which the number of occurrences is equal to or higher than a predetermined threshold value and a predetermined condition is satisfied.

[System configuration, etc.] Further, each component of each device illustrated is a functional concept and does not necessarily need to be physically configured as illustrated. In other words, a specific form of distribution and integration of the devices is not limited to the illustrated one, and all or a part thereof may be functionally or physically distributed or integrated on any unit basis in accordance with various loads and usage conditions. Further, all or any part of each processing function performed by each device can be implemented by a CPU (Central Processing Unit) and a program analyzed and executed by the CPU, or can be implemented as hardware by wired logic.

Further, among the processing described in the embodiment, all or a part of the processing described as being performed automatically can be manually performed, or all or a part of the processing described as being performed manually can be performed automatically by a known method. In addition, the processing procedures, control procedures, specific names, and information including various data and parameters described in the above documents and drawings can be arbitrarily changed unless otherwise specified.

[Program] In one embodiment, the monitoring device 10 and the sharing device 50 can be implemented by an information distribution program being installed as package software or online software on a desired computer, the information distribution program executing the information distribution processing described above. For example, an information processing device executing the information distribution program described above makes it possible to cause the information processing device to function as the monitoring device 10 and the sharing device 50. The information processing device referred to here includes a desktop type or laptop type personal computer. Further, other examples of the information processing device include a mobile communication terminal such as a smartphone, a tablet terminal, a wearable terminal, a mobile phone, PHS (Personal Handyphone System); a slate terminal such as PDA (Personal Digital Assistant); and the like.

Further, the monitoring device 10 and the sharing device 50 can be implemented as an information distribution server device that provides a service related to the information distribution processing described above to a client corresponding to a terminal device used by a user. For example, the information distribution server device is implemented as a server device that provides an information distribution service that receives graph data as input and outputs results of graph signal processing or graph data analysis. In this case, the information distribution server device may be implemented as a Web server, or may be implemented as a cloud that provides services related to the information distribution processing described above by outsourcing.

Figure 24:
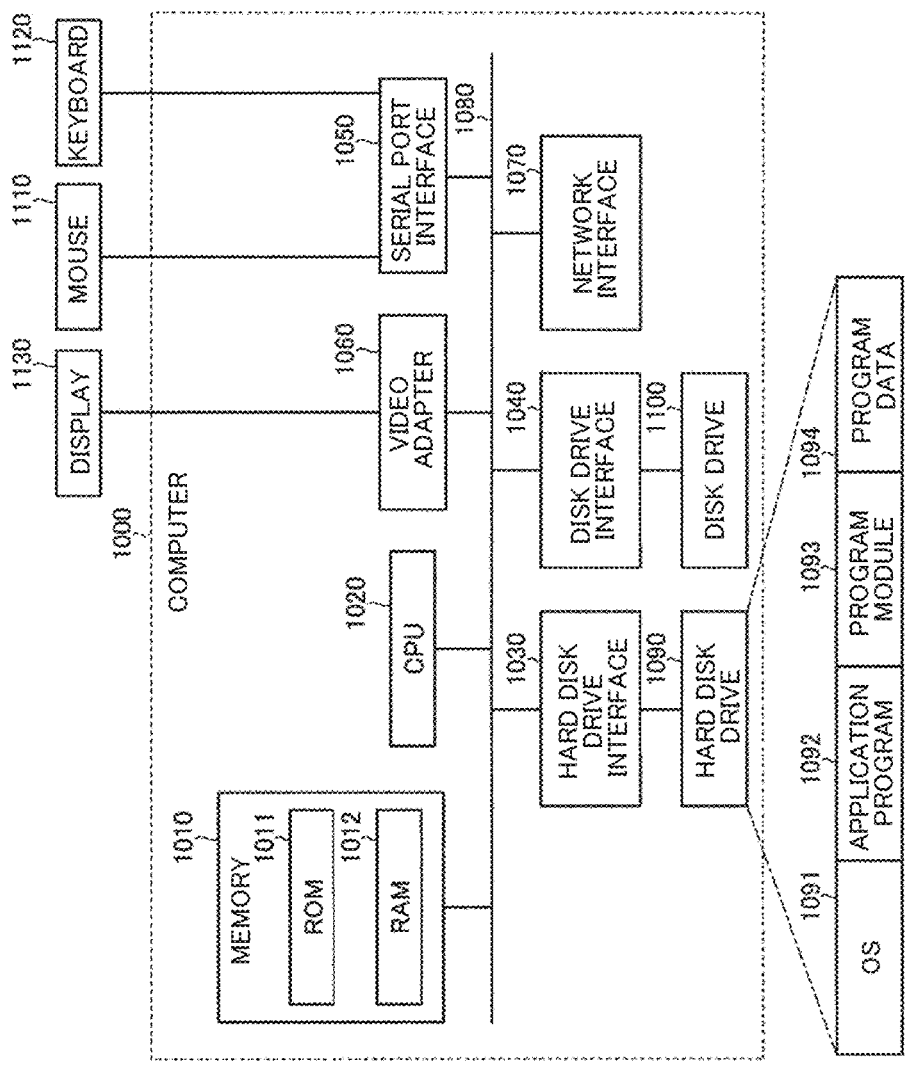
FIG. 24 is a diagram illustrating an example of a computer that executes an information distribution program.

FIG. 24 is a diagram illustrating an example of a computer that executes the information distribution program. A computer 1000 includes, for example, a memory 1010 and a CPU 1020. The computer 1000 also includes a hard disk drive interface 1030, a disk drive interface 1040, a serial port interface 1050, a video adapter 1060, and a network interface 1070. These components are connected by a bus 1080.

The memory 1010 includes a ROM (Read Only Memory) 1011 and a RAM (Random Access Memory) 1012. The ROM 1011 stores, for example, a boot program such as a BIOS (Basic Input Output System). The hard disk drive interface 1030 is connected to a hard disk drive 1090. The disk drive interface 1040 is connected to a disk drive 1100. For example, a removable storage medium such as a magnetic disk or an optical disk is inserted into the disk drive 1100. The serial port interface 1050 is connected to, for example, a mouse 1110 and a keyboard 1120. The video adapter 1060 is connected to, for example, a display 1130.

The hard disk drive 1090 stores, for example, an OS 1091, an application program 1092, a program module 1093, and program data 1094. Accordingly, a program that defines each processing in the monitoring device 10 and the sharing device 50 is implemented as the program module 1093 in which codes executable by the computer are described. The program module 1093 is stored in, for example, the hard disk drive 1090. For example, the program module 1093 for executing processing corresponding to the functional configuration of the monitoring device 10 and the sharing device 50 is stored in the hard disk drive 1090. Note that the hard disk drive 1090 may be replaced by an SSD.

Further, setting data used in the processing in the above-described embodiment is stored as the program data 1094 in, for example, the memory 1010 or the hard disk drive 1090. Then, the CPU 1020 loads the program module 1093 and the program data 1094 stored in the memory 1010 or the hard disk drive 1090, into the RAM 1012 as necessary, to execute the processing of the above-described embodiment.

Note that the program module 1093 and the program data 1094 are not limited to being stored in the hard disk drive 1090, but may be stored in, for example, a removable storage medium and read out by the CPU 1020 via the disk drive 1100 or the like. Alternatively, the program module 1093 and the program data 1094 may be stored in another computer connected via a network (LAN (Local Area Network), WAN (Wide Area Network), etc.). Then, the program module 1093 and the program data 1094 may be read from the other computer by the CPU 1020 via the network interface 1070.

REFERENCE SIGNS LIST

1 Information distribution system
10 Monitoring device
20 Terminal
30 IT system
50 Sharing device
101 Transfer unit
102 Formatting unit
103 Analysis unit
104 Determination unit
105 Update unit
106 Assistance unit
107 Notification unit
120 Monitoring-related information
121 Handling necessity information
122, 522 Detection information
123, 523 Handling procedure information
124, 524 Document information
140 Analysis-related information
141 Output log information
142, 542 Dictionary information
150 Acquisition unit
151, 562 Conversion unit
152 Request unit
153, 563 Management unit
154, 564 Conversion information
160 Provision unit
520 Know-how information
550 Distribution unit
560 Collection unit
561 Reception unit
1211 Handling-necessary information
1212 Handling-unnecessary information
1213 Handling necessity-unknown information

The invention claimed is:

1. An information distribution system comprising:
a plurality of monitoring devices that monitor Information Technology (IT) systems associated with respective monitoring devices; and
a sharing device that transmits and receives information to and from the monitoring devices,
wherein each of the plurality of monitoring devices includes
first processing circuitry configured to:
provide the sharing device with know-how information including at least detection information and handling procedure information, the detection information being information for detecting a failure based on a log message output from the corresponding IT system, the handling procedure information being information in which a log message related to each failure and file information of a handling procedure document for the failure are associated with each other, and
acquire the know-how information managed by the sharing device, and
the sharing device includes
second processing circuitry configured to:
collect the know-how information provided by the plurality of monitoring devices, and merge and manage the collected know-how information, and
distribute the know-how information to the plurality of monitoring devices.

2. The information distribution system according to claim 1, further including third processing circuitry configured to:
format the log message into a predetermined format,
analyze the log message formatted to classify the log message as one of predetermined types,
determine, based on the one of predetermined types and the detection information, whether the log message is handling-necessary information that is related to a failure to be handled, handling-unnecessary information that is not related to any failure, or handling necessity-unknown information that is unknown as to whether to be related to a failure, and search when determining that the log message is the handling-necessary information or the handling necessity-unknown information, the handling procedure information for a handling procedure for a failure related to the log message and notify the handling procedure.

3. The information distribution system according to claim 2, wherein the third processing circuitry is further configured to:
classify the log message based on dictionary information that is a list of abstract expressions of character strings,
provide the know-how information including the dictionary information,
assign Identification (ID)s to the abstract expressions of the collected dictionary information to manage the abstract expressions, and
distribute the dictionary information in which the IDs are assigned.

4. The information distribution system according to claim 2, wherein the third processing circuitry is further configured to:
create dictionary information in which first IDs are assigned to each of abstract expressions of character strings, identify the first ID of the log message based on the dictionary information, and perform classification based on the first ID,
provide the know-how information including the dictionary information,
assign second IDs different from the first IDs to the abstract expressions of the collected dictionary information to manages the abstract expressions,
distribute the dictionary information in which the second IDs are assigned, and
manage as conversion information a correspondence between the first IDs and the second IDs.

5. The information distribution system according to claim 2, wherein
the first processing circuitry is further configured to:
notify, when determining that the log message is the handling necessity-unknown information, a user of information related to the log message and further receive an input of information indicating whether or not the log message is the handling-necessary information, and
update information related to the log message included in the detection information based on an input from the user.

6. A monitoring device comprising:
processing circuitry configured to:
provide a sharing device with know-how information including at least detection information that is information for detecting a failure based on a log message output from an IT system, and handling procedure information being information in which a log message related to a failure and file information of a handling procedure document for the failure are associated with each other; and
acquire the know-how information collected from a plurality of monitoring devices, merged, and managed by the sharing device.

7. A sharing device comprising:
processing circuitry configured to:
collect know-how information provided by a plurality of monitoring devices that monitor Information Technology (IT) systems associated with respective monitoring devices, the know-how information including at least detection information and handling procedure information, the detection information being information for detecting a failure based on a log message output from the corresponding IT system, the handling procedure information being information in which a log message related to each failure and file information of a handling procedure document for the failure are associated with each other, and merge and manage the collected know-how information; and
distribute the know-how information to the plurality of monitoring devices.

* * * * *